(12) United States Patent
Schleich

(10) Patent No.: US 10,989,278 B2
(45) Date of Patent: Apr. 27, 2021

(54) MANUAL TRANSMISSION UNIT HAVING COMPACT STRUCTURE

(71) Applicant: Bayerische Motoren Werke Aktiengesellschaft, Munich (DE)

(72) Inventor: Thomas Schleich, Weilheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 274 days.

(21) Appl. No.: 15/593,392

(22) Filed: May 12, 2017

(65) Prior Publication Data

US 2017/0248201 A1 Aug. 31, 2017

Related U.S. Application Data

(63) Continuation of application No. PCT/EP2015/076177, filed on Nov. 10, 2015.

(30) Foreign Application Priority Data

Nov. 25, 2014 (DE) ...................... 10 2014 223 914.1

(51) Int. Cl.
*F16H 3/093* (2006.01)

(52) U.S. Cl.
CPC ..... *F16H 3/093* (2013.01); *F16H 2003/0931* (2013.01); *F16H 2200/0052* (2013.01); *F16H 2200/0056* (2013.01)

(58) Field of Classification Search
CPC ............ F16H 3/093; F16H 2003/0931; F16H 2200/0052; F16H 2200/0056

(Continued)

(56) References Cited

U.S. PATENT DOCUMENTS 2,825,232 A * 3/1958 Sieving ................... F16H 3/093
74/331
3,138,965 A * 6/1964 Brey ....................... F16H 3/097
74/331

(Continued)

FOREIGN PATENT DOCUMENTS

CN 101900187 A 12/2010
CN 102278429 A 12/2011

(Continued)

OTHER PUBLICATIONS

Chinese-language Office Action issued in counterpart Chinese Application No. 201580049052.0 dated Jul. 4, 2018 with English translation (17 pages).

(Continued)

*Primary Examiner* — William C Joyce
(74) *Attorney, Agent, or Firm* — Crowell & Moring LLP

(57) ABSTRACT

A manual transmission unit has one transmission input shaft, one transmission output shaft, a first intermediate shaft, a second intermediate shaft, a plurality of gear wheels, of which a first and a second drive gear wheel are arranged on the transmission input shaft and connectable in a rotationally fixed manner thereto, in particular in a permanently rotationally fixed manner thereto, and a plurality of torque transmission units for selective connection of additional gear wheels to at least one of the intermediate shafts. The first drive gear wheel intermeshes together with two intermediate wheels and the second drive gear wheel intermeshes together with two additional intermediate wheels. At least two, preferably at least three and more preferably at least four of the intermediate wheels are selectively connectible to the intermediate shafts for power transmission.

16 Claims, 1 Drawing Sheet

(58) Field of Classification Search
USPC .......................................................... 74/331
See application file for complete search history.

(56) References Cited

U.S. PATENT DOCUMENTS

| | | | | |
|---|---|---|---|---|
| 3,159,044 | A * | 12/1964 | Feuillastre | F16H 3/093 74/342 |
| 4,463,621 | A * | 8/1984 | Fisher | F16H 3/006 192/48.6 |
| 7,226,379 | B2 * | 6/2007 | Ibamoto | B60K 6/36 475/221 |
| 7,669,497 | B2 * | 3/2010 | Borgerson | F16H 3/006 74/329 |
| 8,070,649 | B2 * | 12/2011 | Holmes | B60K 6/36 477/5 |
| 8,191,441 | B2 * | 6/2012 | Holmes | B60K 6/405 74/331 |
| 8,342,048 | B2 * | 1/2013 | Rieger | F16H 3/006 74/330 |
| 8,567,273 | B2 * | 10/2013 | Mellet | F16H 3/006 74/329 |
| 8,578,801 | B2 * | 11/2013 | Gumpoltsberger | F16H 3/006 74/331 |
| 2005/0050974 | A1 | 3/2005 | Ibamoto et al. | |
| 2010/0132492 | A1 | 6/2010 | Holmes | |
| 2010/0179024 | A1 * | 7/2010 | Holmes | B60K 6/48 477/5 |
| 2011/0239819 | A1 * | 10/2011 | Shibahata | B60L 50/61 74/665 A |
| 2011/0306456 | A1 * | 12/2011 | Mellet | F16H 3/006 475/198 |
| 2014/0123791 | A1 * | 5/2014 | Mellet | F16H 3/093 74/331 |
| 2014/0196556 | A1 * | 7/2014 | Beck | F16H 3/006 74/331 |
| 2014/0338497 | A1 | 11/2014 | Michel et al. | |
| 2015/0087469 | A1 | 3/2015 | Beck | |
| 2016/0131223 | A1 * | 5/2016 | Hemphill | F16H 3/006 74/331 |

FOREIGN PATENT DOCUMENTS

| | | |
|---|---|---|
| CN | 103867656 A | 6/2014 |
| CN | 103998823 A | 8/2014 |
| DE | 10 2009 055 885 A1 | 9/2010 |
| DE | 10 2011 118 151 A1 | 5/2013 |
| DE | 10 2012 207 028 A1 | 10/2013 |
| EP | 1 512 884 A2 | 3/2005 |
| FR | 2 945 602 A1 | 11/2010 |
| FR | 2 976 039 A3 | 12/2012 |
| JP | 64-35146 A | 2/1989 |

OTHER PUBLICATIONS

International Search Report (PCT/ISA/210) issued in PCT Application No. PCT/EP2015/076177 dated Feb. 10, 2016 with English translation (Four (4) pages).

German-language Written Opinion (PCT/ISA/237) issued in PCT Application No. PCT/EP2015/076177 dated Feb. 10, 2016 (Seventeen (17) pages).

German-language German Office Action issued in counterpart German Application No. 10 2014 223 914.1 dated Aug. 5, 2015 (Four (4) pages).

Chinese-language Office Action issued in counterpart Chinese Application No. 201580049052.0 dated Nov. 23, 2018 with English translation (14 pages).

Chinese-language Office Action issued in counterpart Chinese Application No. 201580049052.0 dated Sep. 16, 2019 with English translation (seven (7) pages).

* cited by examiner

MANUAL TRANSMISSION UNIT HAVING COMPACT STRUCTURE

CROSS REFERENCE TO RELATED APPLICATIONS

This application is a continuation of PCT International Application No. PCT/EP2015/076177, filed Nov. 10, 2015, which claims priority under 35 U.S.C. § 119 from German Patent Application No. 10 2014 223 914.1, filed Nov. 25, 2014, the entire disclosures of which are herein expressly incorporated by reference.

BACKGROUND AND SUMMARY OF THE INVENTION

The invention relates to a manual transmission unit having a compact structure (topology). A manual transmission unit of this type is known from DE 10 2012 207 028 A1.

In the following text, the invention will be described using a manual transmission unit for a motor vehicle, in particular a passenger motor vehicle; this is not to be understood to be a restriction of the invention.

In automotive engineering, the efficiency and the installation space requirement, in particular, are of great significance for drive systems. It is frequently necessary that a manual transmission unit which is set up for adaptation of the speed/torque characteristic diagram of the drive machine to the load requirement is accommodated in a predefined installation space of the motor vehicle. The load requirements arise, in particular, from the driving request (acceleration and speed) and further boundary conditions (uphill or downhill section, vehicle mass, etc.). Furthermore, the manual transmission unit is to be capable of being operated with particularly high efficiency, in order to make a low energy requirement and low $CO_2$ emissions possible. The constant development in the field of transmission technology makes it possible to realize new topologies (geometrical arrangement of gearwheels and transmission shafts) for manual transmission units.

DE 10 2012 207 028 A1 discloses a manual transmission unit of compact design having two axially parallel shaft trains. Furthermore, the transmission device has a spur gear mechanism and a planetary gear mechanism. Furthermore, the transmission device has a multiplicity of shifting devices, by way of which different, discrete transmission ratios can be set.

It is an object of the invention to provide a manual transmission unit with a particularly low installation space requirement, in particular in the direction of the transmission input shaft.

This and other objects are achieved by a manual transmission unit having at least one transmission input shaft, one transmission output shaft, a first intermediate shaft, a second intermediate shaft, a plurality of gearwheels, of which a first and a second drive gearwheel are arranged on the transmission input shaft and can be connected fixedly to the latter so as to rotate with it, in particular are connected fixedly to the latter permanently so as to rotate with it, and having a plurality of torque transmission devices for selectively connecting further gearwheels to at least one of the intermediate shafts, wherein the first drive gearwheel meshes at least with two intermediate gears, and the second drive gearwheel meshes at least with two further intermediate gears, and at least two, preferably at least three and with preference at least four of said intermediate gears can be connected selectively to the intermediate shafts for power transmission.

According to the invention, drive power can be transmitted from a transmission input shaft to a transmission output shaft by means of different transmission ratios. A manual transmission unit according to the invention results, in particular, in the advantage of a particularly low axial installation space requirement (direction of extent in the direction of the transmission shafts). As a result of a low axial installation space requirement, in particular, an additional arrangement of drive machines, in particular in order to convert a drive system into a hybrid system, is made possible. A low axial installation space requirement has a particularly advantageous effect, in particular, for front transverse drive designs.

In the context of the invention, a manual transmission unit is to be understood to mean a device for changing the speed ratio between a transmission input shaft and a transmission output shaft. In particular, the adaptation of the speed/torque characteristic diagram of a drive machine, in particular an internal combustion engine on its own and/or in combination with an electric or hydraulic drive machine, to the load requirement of a motor vehicle (driving resistances) can be achieved by way of a manual transmission unit. A manual transmission unit preferably has a plurality of discrete speed ratios, what are known as gears or shift stages. To this end, a manual transmission unit preferably has a plurality of transmission shafts, in particular arranged in parallel to one another, and gearwheels which are arranged, in particular, on said transmission shafts. Furthermore, a transmission device of this type preferably has a transmission housing. Here, the transmission housing is preferably set up to receive the wheels and shafts and secondly, further preferably, to receive a lubricant, in particular a transmission oil.

The transmission device according to the invention is preferably provided for longitudinal installation in a motor vehicle, and with preference for transverse installation. Here, in this context, the longitudinal installation is to be understood to mean that the transmission input shaft is oriented parallel to the main driving direction of the vehicle. Furthermore, the transverse installation is to be understood to mean that the transmission input shaft is oriented transversely, preferably orthogonally, with respect to said main driving direction.

In the context of the invention, a transmission input shaft is to be understood to mean a device or a component, by way of which drive power (rotational speed, torque) can be fed to the transmission device, preferably can be fed from the drive machine. The transmission input shaft can further preferably be connected to a drive machine, in particular to an internal combustion engine. The transmission input shaft can preferably be connected to an internal combustion engine by way of a friction clutch or a torque converter. Further preferably, a vibration damper or absorber device, with preference at least one part of a single-mass or multiple-mass flywheel, is arranged completely or partially on a transmission input shaft.

In the context of the invention, a transmission output shaft is to be understood to mean a device or a component, by way of which the drive power (rotational speed, torque) can be discharged from the transmission device. The rotational speed and therefore also the torque can preferably be varied between the transmission input shaft and the transmission output shaft by way of the transmission device. The drive power can preferably be transmitted in the direction of the drive wheels or the drive wheel of a motor vehicle by way of the transmission output shaft. Further preferably, the drive power can be transmitted to at least one articulated shaft or with preference a differential gear device by the transmission output shaft.

In the context of the invention, an intermediate shaft is to be understood to mean a device or a component which is arranged within the transmission device and which is provided for transmitting at least part of the drive power. Further preferably, the intermediate shaft is set up to receive one or more gearwheels which interact or mesh with one or more gearwheels received on the transmission input shaft or transmission output shaft in order to vary the rotational speed and the torque.

In the context of this invention, the meshing of two gearwheels is to be understood to mean that the gearwheels are in contact, in particular roll on one another, in order to transmit movement or power.

Further preferably, an intermediate shaft can be understood in the context of this invention to be a countershaft. Further preferably, the intermediate shaft can be understood to be a sectional shaft of a group transmission. Here, an intermediate shaft is arranged, in relation to the power flow from the transmission input shaft to the transmission output shaft, between the two shafts. In relation to the geometrical arrangement, one of the intermediate shafts or preferably two or more is/are arranged axially parallel with respect to at least one of the transmission input or output shaft, preferably with respect to both.

In the context of the invention, a torque transmission device is to be understood to mean a device, by way of which a power flow (torque, rotational speed) can be interrupted or established. The power flow can with preference be established and interrupted by way of a frictionally locking connection, preferably positively locking connection, and particularly preferably by way of a frictionally/positively locking connection. A torque transmission device is preferably selected from a group of devices which has at least the following elements:

synchronizing device, preferably a cone synchronizer device,
claw coupling,
gear coupling,
slider sleeve,
frictionally locking multiple disk clutch or jaw clutch,
hydrodynamic or hydrostatic clutch,
Visco clutch.

In the case of a manual transmission unit according to the invention, it is made possible to use at least one or more of the torque transmission devices "multiple times". By way of example, it is made possible to use one of the torque transmission devices to activate a first of a (first to sixth gear) of a further second gear (first to sixth gear); in particular, further compaction of the manual transmission unit is made possible as a result.

In the context of the invention, the selective connection of gearwheels to at least one of the transmission shafts is to be understood to mean that a power flow can be established between one of the transmission shafts and at least one of the gearwheels by way of one of the torque transmission devices. Further preferably, it is to be understood to mean that two gearwheels can be connected to one of the transmission shafts by way of a torque transmission device in such a way that either the one or the other gearwheel is connected to the transmission shaft.

A torque transmission device preferably has a slider sleeve section, in which it is connected fixedly to one of the transmission shafts so as to rotate with it and is mounted such that it can be displaced in the direction of the rotational axis of the transmission shaft, that is to say, in particular, axially. Further preferably, the torque transmission device has a torque transmission region, preferably two torque transmission regions, which can be brought into connection, in particular alternately, with the one or other gearwheel, in particular for the transmission of power to one of the transmission shafts.

In the context of the invention, a transmission cross-sectional plane is to be understood to mean an imaginary plane which is arranged orthogonally with respect to the transmission input shaft. Further preferably, the transmission cross-sectional plane is arranged orthogonally with respect to the transmission input shaft and with respect to the transmission output shaft and with respect to at least one of the intermediate shafts or preferably with respect to two or more of the intermediate shafts.

In the context of the invention, a singular point in the transmission cross-sectional plane is to be understood to mean the penetration point of a rotational axis through said plane, about which rotational axis one of the transmission shafts (transmission input shaft, transmission output shaft, first, second intermediate shaft) is mounted rotatably.

In the context of the invention, a gear plane is to be understood to mean a plane which is parallel to the transmission cross-sectional plane. Individual gear planes are preferably spaced apart from one another axially. In the context of the invention, axial is to be understood to mean the direction perpendicular with respect to the transmission cross-sectional plane.

Further preferably, a gear plane intersects at least two gearwheels which, in particular, mesh with one another, it being possible for drive power (rotational speed, torque) to be transmitted between the two gears. The two gears are then called gears which are arranged in the one gear plane in the context of the invention. Gearwheels which are arranged in one gear plane preferably mesh with one another.

Therefore, a gear plane is preferably to be understood to be a common sectional plane of two gearwheels, the one gearwheel being arranged on the transmission input shaft or transmission output shaft and the other gearwheel being arranged on one of the intermediate shafts.

The gear plane is preferably to be understood to be a plane of symmetry of at least one of the gearwheels, preferably of both. Further preferably, a gear plane is arranged at least in a region of said gearwheels, which region is set up for power transmission.

In relation to gearwheels, in particular, the toothing is to be understood to be a region which is set up for power transmission (active toothing width).

In one preferred embodiment, the penetration points of three or four transmission shafts (transmission input shaft, transmission output shaft, first, second intermediate shaft) result as incongruent points in the transmission cross-sectional plane. This is to be understood to mean, in particular, that the points are spaced apart from one another in the common plane. A particularly compact overall design can be achieved and therefore an improved manual transmission can be provided, in particular, by virtue of the fact that the penetration points are spaced apart from one another and the transmission shafts are likewise spaced apart from one another as a result, in particular are not arranged coaxially with respect to one another.

In one preferred embodiment, the manual transmission unit has a multiplicity of gear planes, but preferably four gear planes (first, second, third, fourth). At least two gearwheels which mesh with one another are preferably arranged in one gear plane. Further preferably, three or more gearwheels which mesh with one another are arranged in one gear plane. More than two gearwheels which mesh with one another in one gear plane are to be understood, in particular, to be a gearwheel chain. A gearwheel chain for producing a reverse ratio (reverse gear) is preferably arranged in a common gear plane. The gear planes are preferably arranged parallel with respect to the transmission cross-sectional plane and are spaced apart from one another in the axial direction. Further preferably, the manual transmission unit has a first and a second reverse gear.

In one preferred embodiment, a first and a second drive gearwheel are arranged on the transmission input shaft. The drive gears are preferably connected fixedly to said shaft so as to rotate with it. The first and the second drive gearwheel are preferably permanently connected fixedly to the transmission input shaft so as to rotate with it. At least one of said drive gearwheels is preferably connected to the transmission input shaft in a frictionally locking manner, in particular by means of a press fit, with preference in a positively locking manner, in particular by means of a splined shaft connection or particularly preferably in an integrally joined manner, in particular in a single-piece manner or with preference by means of a welded connection. Further preferably, at least one of the gearwheels is connected to the transmission input shaft by way of a combination of two of the abovementioned connecting types. A particularly simple construction of the manual transmission unit is made possible, in particular, by way of the permanent fixed connection of the drive gearwheels to the transmission input shaft so as to rotate with it.

In one preferred embodiment, the first drive gearwheel is arranged in the fourth gear plane and the second drive gearwheel is arranged in the third gear plane. The transmission input shaft preferably enters into the manual transmission unit on a transmission input side, and further preferably the transmission input side faces the drive machine for providing drive power. The fourth gear plane preferably has the greatest spacing from the transmission input side of the gear planes which are provided for receiving the gearwheels. Tests have shown that an arrangement of this type of the drive gearwheels has a particularly favorable effect on the reliability of the transmission unit.

In one preferred embodiment, a first and a second output gearwheel are arranged on the transmission output shaft. The output gears are preferably connected fixedly to the shaft so as to rotate with it. The first and the second output gearwheel are preferably permanently connected fixedly to the transmission output shaft so as to rotate with it. At least one of the output gearwheels is preferably connected to the transmission input shaft in a frictionally locking manner, in particular by means of a press fit, with preference in a positively locking manner, in particular by means of a splined shaft connection or particularly preferably in an integrally joined manner, in particular in a single-piece manner or preferably by means of a welded connection. Further preferably, at least one of the gearwheels is connected to the transmission output shaft by way of a combination of two of the abovementioned connecting types. A particularly simple construction of the manual transmission unit is made possible, in particular, by way of the permanent fixed connection of the output gearwheels to the transmission output shaft so as to rotate with it. It is further preferably made possible in this way to arrange the torque transmission devices, in particular for the gearwheels, on three or fewer, preferably on two transmission shafts and therefore to make a particularly simple actuation thereof possible.

In one preferred embodiment, the first output gearwheel is arranged in the second gear plane and the second output gearwheel is arranged in the first gear plane. The first gear plane preferably has the smallest spacing from the transmission input side of the gear planes which are provided for receiving the gearwheels. Tests have shown that an arrangement of this type of the drive gearwheels has a particularly favorable effect on the reliability of the transmission unit.

In one preferred embodiment, a first, second, third and fourth intermediate gearwheel are arranged on the first intermediate shaft. Here, preferably, the first intermediate gearwheel is arranged in the fourth gear plane, the second intermediate gearwheel is arranged in the third gear plane, the third intermediate gearwheel is arranged in the second gear plane, and the fourth intermediate gearwheel is arranged in the first gear plane. The first to fourth intermediate gearwheels are preferably set up to be permanently in contact with the drive and output gearwheels which are arranged in each case in the same gear plane. In particular, a division of this type of the intermediate gearwheels results in a particularly advantageous embodiment of the manual transmission unit.

In a further preferred embodiment, a fifth, sixth, seventh and eighth intermediate gearwheel are arranged on the second intermediate shaft. Here, the fifth intermediate gearwheel is preferably arranged in the fourth gear plane, the sixth intermediate gearwheel is arranged in the third gear plane, the seventh intermediate gearwheel is arranged in the second gear plane, and the eighth intermediate gearwheel is arranged in the first gear plane. The fifth to eighth intermediate gearwheels are preferably set up to be permanently in contact (and to mesh with) the drive and output gearwheels which are arranged in each case in the same gear plane. In particular, a division of this type of the intermediate gearwheels results in a particularly advantageous embodiment of the manual transmission unit.

In one preferred embodiment, at least one or more of the intermediate gearwheels can be connected in a torque-conducting manner to the respective intermediate shaft by way of preferably in each case one torque transmission device. The first and the second intermediate gearwheel can preferably be connected selectively to the first intermediate shaft by way of a first torque transmission device. The third and the fourth intermediate gearwheel can preferably be connected selectively to the first intermediate shaft by way of a second torque transmission device. The fifth and the sixth intermediate gearwheel can preferably be connected selectively to the second intermediate shaft by way of a third torque transmission device. The seventh and the eighth intermediate gearwheel can preferably be connected selectively to the second intermediate shaft by way of a fourth torque transmission device. A particularly space-saving and therefore compact construction of the manual transmission unit can be achieved, in particular, by way of the use of one torque transmission device for selectively connecting two intermediate gearwheels to an intermediate shaft.

In one preferred embodiment, a reverse ratio gearwheel is arranged in one of the gear planes (first, second, third or fourth). Further preferably, the reverse ratio gearwheel meshes with one of the intermediate gearwheels and one of the output gearwheels. A particularly compact construction of the manual transmission unit is made possible, in particular, by way of an arrangement of the reverse ratio gearwheel between one of the intermediate gearwheels and one of the output gearwheels. The reverse ratio gearwheel is preferably arranged in the fourth gear plane. Tests have shown that an arrangement of this type results in particularly simple accessibility to the gearwheel. Further preferably, the reverse ratio gearwheel is arranged in the third gear plane. In particular, an arrangement of this type results in a particularly compact construction. The reverse ratio gearwheel is preferably arranged in the first gear plane. In particular, said arrangement results in simple assembly capability and also a compact construction. Further preferably, the reverse ratio gearwheel is arranged in the second gear plane.

In a further preferred embodiment, the transmission output shaft has two sections for outputting the drive power in the direction of the drive wheels. One of the sections is preferably arranged on the transmission input side of the manual transmission unit, and a second of said sections is arranged on that side of the manual transmission unit which lies opposite said side. By way of a configuration of this type of the transmission output shaft, in particular, the drive power can be distributed between left and right particularly satisfactorily in the case of an installation of the manual transmission unit transversely with respect to the driving direction, and the drive power can be distributed between rear and front particularly satisfactorily in the case of a longitudinal installation.

In one preferred embodiment, a manual transmission unit according to the invention is a constituent part of a drive system for a motor vehicle, in particular a passenger motor vehicle. In this context, connecting means are preferably to be understood to mean articulated shafts, shafts, transmission devices, in particular a differential transmission device. A manual transmission unit according to the invention is preferably set up for what is known as "transverse installation". Here, in this context, the transverse installation relates to the main driving direction of the motor vehicle.

Other objects, advantages and novel features of the present invention will become apparent from the following detailed description of one or more preferred embodiments when considered in conjunction with the accompanying drawings.

DETAILED DESCRIPTION OF THE DRAWINGS

Figures 1, 2:
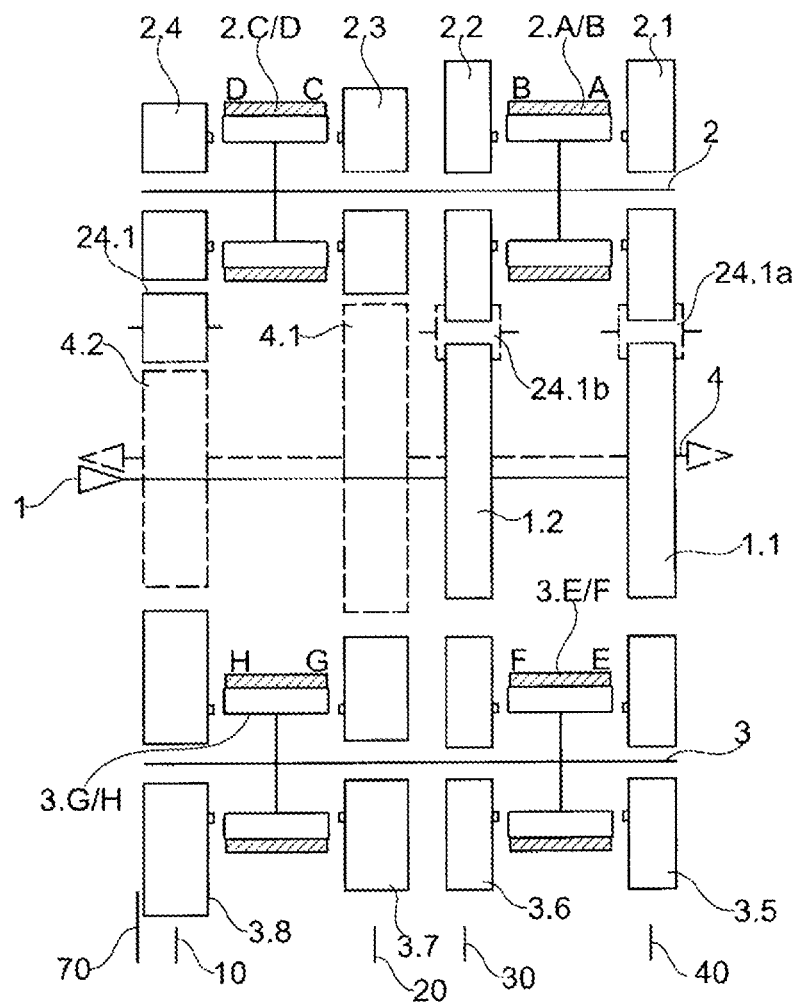
FIG. 1 is a longitudinal section view through a manual transmission unit according to one embodiment of the invention.
FIG. 2 is a shift diagram for a manual transmission unit according to the embodiment of the invention.

FIG. 1 shows a longitudinal section through a manual transmission unit. Both the gear planes 10, 20, 30, 40 and the transmission cross-sectional plane 70 result merely as a straight line in this illustration. Here, the planes extend over the cross-sectional area of the manual transmission unit in the respective plane. The manual transmission unit has six forward gears and one reverse gear.

FIG. 1 shows three alternatives for realizing the reverse gear (reverse ratio gearwheel 24.1, 24.1a, 24.1b). The reverse ratio gearwheel 24.1, 24.1a, 24.1b can be arranged in the first 10, third 30 or fourth 40 gear plane. Here, the reverse ratio gearwheels 24.1a and 24.1b show alternative positions for the gear in comparison with the described variant with the reverse ratio gearwheel 24.1.

In the case of an otherwise at least similar topology, in each case always only one reverse ratio gearwheel, that is to say either 24.1 or 24.1a or 24.1b is arranged in the transmission. If the reverse gear is provided via the reverse ratio gearwheel 24.1a, the gearwheel 2.1 on the shaft 2 meshes with the reverse ratio gearwheel 24.1a, and the latter in turn meshes with the gearwheel 1.1, and a gear chain is thus produced for reversing the rotational direction and ultimately for realizing the reverse gear. The reverse ratio gearwheels 24.1 and 24.1b are dispensed with in this variant, and the gearwheels 2.4 and 4.2 mesh directly with one another, just like the gearwheels 2.1 and 1.2.

If the reverse gear is provided via the reverse ratio gearwheel 24.1b, the gearwheel 2.2 on the shaft 2 meshes with the reverse ratio gearwheel 24.1b, and the latter in turn meshes with the gearwheel 1.2, and a gear chain is thus produced for reversing the rotational direction and ultimately for realizing the reverse gear. The reverse ratio gearwheels 24.1 and 24.1a are dispensed with in this variant, and the gearwheels 2.4 and 4.2 mesh directly with one another, just like the gearwheels 2.1 and 1.1.

The transmission shafts (1 to 4) are received and mounted rotatably in a transmission housing (not shown). A first 1.1 and a second 1.2 drive gearwheel are arranged on the transmission input shaft. The gearwheels (1.1, 1.2) are configured in one piece with the transmission input shaft 1. A first 4.1 and a second 4.2 output gearwheel are arranged on the transmission output shaft 4. The gearwheels (4.1, 4.2) are configured in one piece with the transmission output shaft.

The first drive gearwheel 1.1 is arranged in the fourth gear plane 40 and meshes permanently with the first intermediate gearwheel 2.1 which is arranged on the first intermediate shaft 2 and with the fifth intermediate gearwheel 3.5 which is arranged on the second intermediate shaft 3. The second drive gearwheel 1.2 is arranged in the third gear plane 30 and meshes permanently with the second intermediate gearwheel 2.2 which is arranged on the first intermediate shaft 2 and with the sixth intermediate gearwheel 3.6 which is arranged on the second intermediate shaft 3.

The first output gearwheel 4.1 on the transmission output shaft 4 is arranged in the second gear plane 20 and meshes permanently with the third intermediate gearwheel 2.3 which is arranged on the first intermediate shaft 2 and with the seventh intermediate gearwheel 3.7 which is arranged on the second intermediate shaft 3. The second output gearwheel 4.2 on the transmission output shaft 4 is arranged in the first gear plane 10 and meshes permanently with the reverse ratio gearwheel 9, and the latter meshes permanently with the fourth intermediate gearwheel 2.4 which is arranged on the first intermediate shaft 2. Furthermore, the output gearwheel 4.2 meshes permanently with the eighth intermediate gearwheel 3.8 which is arranged on the second intermediate shaft 3.

Here, gearwheels which are arranged in each case in two different gear planes form one gear stage. In order to configure one gear stage, the gearwheels (2.1, 2.2, 2.3, 2.4, 3.5, 3.6, 3.7, 3.8) on the intermediate shafts (2, 3) can be connected in a torque-conducting manner to the intermediate shafts (2, 3) by way of torque transmission devices (2.A/B, 2.C/D, 3.E/F, 3.G/H).

Either the first intermediate gearwheel 2.1 or the second intermediate gearwheel 2.2 can be connected in a torque-conducting manner to the first intermediate shaft 2 by way of the torque transmission device 2.A/B. In order to produce the torque-conducting connection, the torque transmission device 2.A/B and the gearwheels 2.1 and 2.2 make contact in the torque transmission regions A or B.

Either the third intermediate gearwheel 2.3 or the fourth intermediate gearwheel 2.4 can be connected in a torque-conducting manner to the first intermediate shaft 2 by way of the torque transmission device 2.C/D. In order to produce the torque-conducting connection, the torque transmission device 2.C/D and the gearwheels 2.3 and 2.4 make contact in the torque transmission regions C or D.

Either the fifth intermediate gearwheel 3.5 or the sixth intermediate gearwheel 3.6 can be connected in a torque-conducting manner to the second intermediate shaft 3 by way of the torque transmission device 2.E/F. In order to produce the torque-conducting connection, the torque transmission device 2.E/F and the gearwheels 3.5 and 3.6 make contact in the torque transmission regions E or F.

Either the seventh intermediate gearwheel 3.7 or the eighth intermediate gearwheel 3.8 can be connected in a torque-conducting manner to the second intermediate shaft 3 by way of the torque transmission device 2.G/H. In order to produce the torque-conducting connection, the torque transmission device 2.G/H and the gearwheels 3.7 and 3.8 make contact in the torque transmission regions G or H.

FIG. 2 shows a shift diagram for a manual transmission unit according to the invention; here, the reverse gear is realized via the reverse ratio gearwheel 24.1. Here, an empty field in the illustration means that no torque transmission is made possible. Here, merely the shift points between the respective torque transmission device, the gearwheel and the respective transmission shaft are specified by A to H. The torque transmission device 2.A/B is arranged on the first intermediate shaft 2 and serves the torque transmission regions A and B. The torque transmission device 2.C/D is arranged on the first intermediate shaft 2 and serves the torque transmission regions C and D. The torque transmission device 3.E/F is arranged on the second intermediate shaft 3 and serves the torque transmission regions E and F. The torque transmission device 3.G/H is arranged on the second intermediate shaft 3 and serves the torque transmission regions G and H.

Torque transmission devices of this type for so-called "dual shifts" are known from the prior art.

In the context of the invention, "serves" is to be understood to mean that the torque transmission device enables or interrupts a transmission of torque from the respective gearwheel to one of the transmission shafts.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A manual transmission unit, comprising:
   one transmission input shaft having an input end at a first end of the transmission unit;
   one transmission output shaft having an output end at a second end of the transmission unit opposite the first end;
   a first intermediate shaft;
   a second intermediate shaft;
   a plurality of gearwheels, of which a first and a second drive gearwheel are arranged on the transmission input shaft and are connected fixedly to the transmission input shaft so as to rotate with the transmission input shaft at all times, and of which a first and a second output gearwheel are arranged on the transmission output shaft and are connected fixedly to the transmission output shaft so as to rotate with the transmission output shaft, the first and second output gearwheels being closer to the first end of the transmission unit than the first and second input gearwheels;
   a plurality of torque transmission devices for selectively connecting intermediate gearwheels of the plurality of gearwheels to at least one of the intermediate shafts, wherein
   the first drive gearwheel meshes at least with two of the intermediate gearwheels adjacent to the first drive gearwheel, or with at least one of the intermediate gearwheels and a first reverse ratio gearwheel adjacent to the first drive gearwheel,
   the second drive gearwheel meshes at least with two intermediate gearwheels adjacent to the second drive gearwheel, or with at least one of the intermediate gearwheels and a second reverse ratio gearwheel adjacent to the second drive gearwheel,
   the first output gearwheel meshes with at least with two of the intermediate gearwheels adjacent to the first output gearwheel,
   at least two of said intermediate gearwheels are connected selectively to the intermediate shafts for power transmission,
   all of the intermediate gearwheels are rotatably supported directly on respective ones of the first intermediate shaft and second intermediate shaft,
   each of the first and second intermediate shafts is continuous between the intermediate gearwheels meshed with the first and second drive gearwheels and the intermediate gearwheels meshed with the first and second output gearwheels, and
   the transmission input shaft and the transmission output shaft are disposed between the first intermediate shaft and the second intermediate shaft when seen in a longitudinal sectional view of the manual transmission unit.

2. The manual transmission unit according to claim 1, wherein
   the manual transmission unit has a transmission cross-sectional plane which is orthogonal with respect to the transmission input shaft,
   the transmission cross-sectional plane also intersects the transmission output shaft and the first and second intermediate shafts orthogonally,
   each of said four transmission shafts is mounted so as to be rotatable about in each case one rotational axis,
   said rotational axes are provided as singular points in the transmission cross-sectional plane, and
   the four points are incongruent with respect to one another.

3. The manual transmission unit according to claim 2, wherein
   of the plurality of gearwheels, three of four gear planes each have at least three of the gearwheels, and
   said four planes are spaced apart parallel to the transmission cross-sectional plane and axially from one another.

4. The manual transmission unit according to claim 3, wherein
   at least one or both of said drive gearwheels is connected to the transmission input shaft in a positively locking manner.

5. The manual transmission unit according to claim 4, wherein
   the first drive gearwheel is arranged in the fourth gear plane, and
   the second drive gearwheel is arranged in the third gear plane.

6. The manual transmission unit according to claim 5, wherein
the first output gearwheel is arranged in the second gear plane, and
the second output gearwheel is arranged in the first gear plane.

7. The manual transmission unit according to claim 3, wherein
a first, second, third and fourth intermediate gearwheels are arranged on the first intermediate shaft,
the first intermediate gearwheel is arranged in the fourth gear plane,
the second intermediate gearwheel is arranged in the third gear plane,
the third intermediate gearwheel is arranged in the second gear plane, and
the fourth intermediate gearwheel is arranged in the first gear plane.

8. The manual transmission unit according to claim 7, wherein
a fifth, sixth, seventh and eighth intermediate gearwheels are arranged on the second intermediate shaft,
the fifth intermediate gearwheel is arranged in the fourth gear plane,
the sixth intermediate gearwheel is arranged in the third gear plane,
the seventh intermediate gearwheel is arranged in the second gear plane, and
the eighth intermediate gearwheel is arranged in the first gear plane.

9. The manual transmission unit according to claim 8, wherein
the intermediate gearwheels are connectable in a torque-conducting manner to the respective intermediate shafts by way of torque transmission devices,
the first and the second intermediate gearwheels are connectable selectively to the first intermediate shaft by way of a first torque transmission device,
the third and fourth intermediate gearwheels are connectable selectively to the first intermediate shaft by way of a second torque transmission device,
the fifth and sixth intermediate gearwheels are connectable selectively to the second intermediate shaft by way of a third torque transmission device, and
the seventh and eighth intermediate gearwheels are connectable selectively to the second intermediate shaft by way of a fourth torque transmission device.

10. The manual transmission unit according to claim 3, wherein
a reverse ratio gearwheel is arranged in one of the first, second, third or fourth gear planes, and
the reverse ratio gearwheel meshes with one of the intermediate gearwheels and one of the output gearwheels.

11. The manual transmission unit according to claim 10, wherein the reverse ratio gearwheel is arranged in the first gear plane.

12. The manual transmission unit according to claim 3, wherein
the at least one or both of said drive gearwheels are configured in one piece with the transmission input shaft.

13. The manual transmission unit according to claim 1, wherein
at least three of the intermediate gearwheels are connected selectively to the intermediate shafts for power transmission.

14. The manual transmission unit according to claim 1, wherein at least four of the intermediate gearwheels are connected selectively to the intermediate shafts for power transmission.

15. A drive system for a motor vehicle, comprising:
a manual transmission unit according to claim 1;
at least one drive machine;
at least one drivable wheel/tire combination; and
a connector for mechanical transmission of power from the manual transmission unit to said wheel/tire combination.

16. The drive system according to claim 15, wherein the drive machine is an internal combustion engine.

* * * * *